2 Sheets—Sheet 1.
C. NERACHER.
WOOD TRIMMING MACHINE.
No. 11,286. Reissued Nov. 22, 1892.
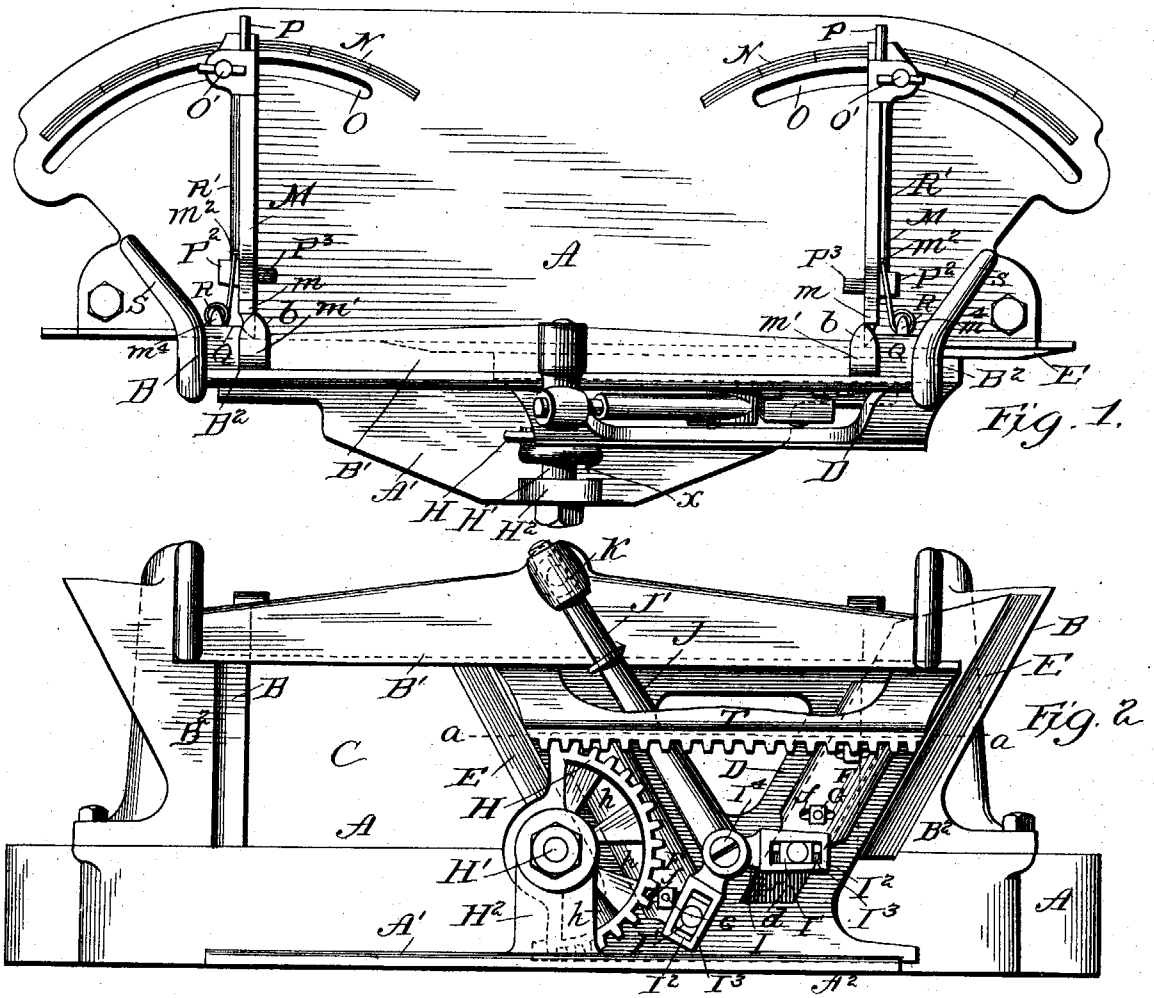
Attest
Walter Douglas
F. L. Middleton.
Inventor
Charles Neracher
by Elis Spear
Atty.
THE NORRIS PETERS CO., PHOTO-LITHO., WASHINGTON, D. C.

2 Sheets—Sheet 2.
C. NERACHER.
WOOD TRIMMING MACHINE.
No. 11,286. Reissued Nov. 22, 1892
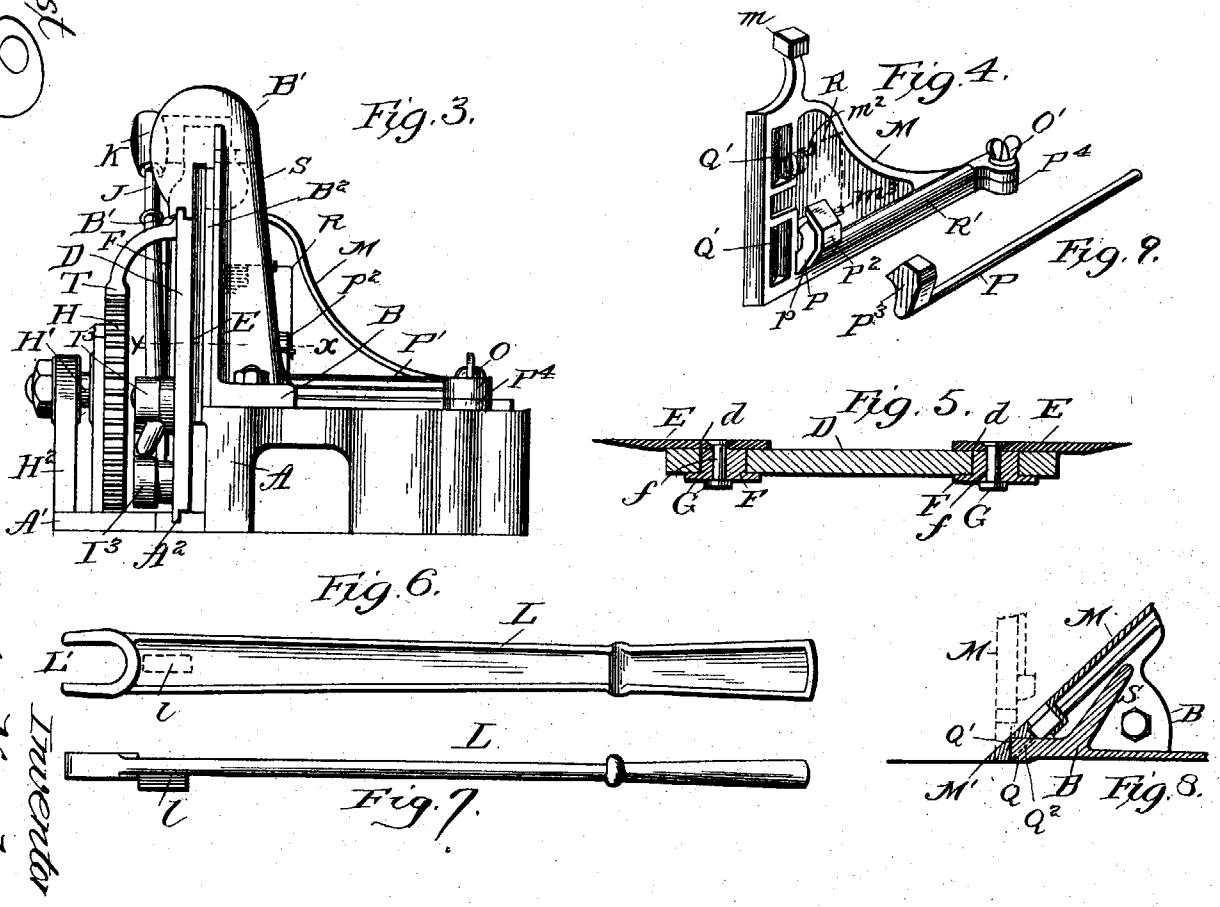
Attest
Walter Douglass
F. L. Middleton
Inventor
Charles Neracher
by Geo. Spear
Atty.
THE NORRIS PETERS CO., PHOTO-LITHO., WASHINGTON, D. C.

UNITED STATES PATENT OFFICE.

CHARLES NERACHER, OF CLEVELAND, OHIO.

WOOD-TRIMMING MACHINE.

SPECIFICATION forming part of Reissued Letters Patent No. 11,286, dated November 22, 1892.

Original No. 461,162, dated October 13, 1891. Application for reissue filed May 17, 1892. Serial No. 433,393.

*To all whom it may concern:*

Be it known that I, CHARLES NERACHER, a citizen of the United States, and a resident of Cleveland, county of Cuyahoga, State of Ohio, have invented certain new and useful Improvements in Wood-Trimming Machines, of which I hereby declare the following to be a full, clear, and exact description, such as will enable others skilled in the art to which it appertains to make and use the same.

My invention relates, to improvements in wood-trimming machines; and its objects are to provide means for cutting miter-joints by a drawing movement of the knife with a cutting inclination of forty-five degrees for the purpose of producing a smooth and easy cut with great precision and positive movement.

My invention relates, also, to improvements in gages for adjusting the angle of the joint; and it consists in the combination and arrangement of the various parts and details of construction, as hereinafter described in the specification, shown in the accompanying drawings, and more particularly pointed out in the claims.

In the accompanying drawings, Figure 1 is a plan view of my invention. Fig. 2 is a front elevation. Fig. 3 is an end elevation. Fig. 4 is a view in perspective of the gage detached. Fig. 5 is a section through knives and cross-head on line *a a*, Fig. 2. Figs. 6 and 7 represent, respectively, a face and an edge view of the operating-lever. Fig. 8 is a horizontal section through one of the supports B. Fig. 9 represents the sliding gage.

In the figures, A is the main table of the machine. B is a vertical portion mounted upon the table A and provided with the central opening C and overhanging cross-head guide B′, connecting the end supports $B^2$. A similar guide $A^2$ for the lower bearing of the cross-head D projects from the foot of the bed-plate A vertically under the guide B′. The cross-head D is provided with slots *d d*, inclining outwardly from below, through which slots are clamped the knives E by means of guiding-plates F and bolts G. Slots *f* in these plates permit slight adjustment for line. A rack T upon the overhanging upper edge of the cross-head propels it through its engagement with the segmental gear H, pivoted at H′ in bearings $H^2$ on the foot-plate A′, and turned by hand, as will be further described in another part of the description. In order to reciprocate these knives E and give them a drawing movement in cutting, the extremities of the clamps F, bearing the knives, are pivoted to the angular levers I in blocks I′, sliding in grooves $I^2$ in the heads $I^3$ of the levers I. These levers are integral with the arm J, which vibrates from the pivotal bearing K upon the overhanging guide B′. The extremity J′ of the arm slides through this bearing as the cross-head reciprocates. This arm J is pivoted at $I^4$ to the cross-head body.

In operation it will be seen that as the segmental gear reciprocates the cross-head in its bearings the arm J will vibrate upon pivot K and the angular levers I will oscillate in such a manner as to alternately raise and lower the knives E with the accompanying plates F, the knife in advance of the cross-head rising and the one in the rear lowering accordingly. The resultant of the combined movements, horizontal and vertical, is forty-five degrees. The angle at which the cutting-knife is usually placed and the angle at which the knives are fixed in their slots is between fifty degrees and sixty degrees, preferably fifty-three degrees, according as the speed of the rack and segment would combine with the angular progress of the knife to form forty-five degrees.

The means for operating the segment is shown in Fig. 6, where L is a lever provided with the boss *l*, adapted to enter one of the rectangular openings *h* in the gear-segment H. The end of the lever is slotted at L′ in order to stride the shaft-pivot H′ of the gear H between the gear H and bearing $H^2$, as shown at X in Fig. 1.

The gage for the angle of the joint desired is shown in Figs. 1, 3, and 4, where M is the gage, a triangular frame having a beveled inner edge, one of which gages is vertically stationed at either edge of the opening. At the upper edge of the gage is the rectangular boss *m*, which bears against the boss *m′* upon the support B at its rear upper edge. This boss will be seen to be so curved as to permit the inner vertical edge of the gage beveled at M′ to coincide with the cutting plane of the knives E and never to vary from it, while the outer extremity of the gage moves in the graduated arc N and is secured at any desired angle by means of the clamping-screw O′, passing through the slot O. This clamping-screw also serves to secure the gage P, which slides backward and forward in the channel R′ in the gage M. The gage P is provided with a large head $P^3$ at right angles thereto, which is adapted to serve as a back-rest for short pieces which are to be cut by the reciprocating knives. When, however, this gage is not in use, the head can be thrown back and secured in the recess $P^2$ out of the line of the gage M. In Fig. 4 is seen the detail of this portion in perspective, the head resting against the shoulder *p* when withdrawn.

The rectangular bosses Q, Fig. 8, on the vertical support B correspond to and are designed to engage the angular recesses Q′ in the gage M and assist in preserving the vertical position of the gage M in its horizontal movements. The central portion $Q^2$ of the support B is beveled away, as in dotted lines Fig. 8, thus leaving the bosses Q projecting. A spring R serves to retain the rectangular boss *m* in contact with the curved boss or projection *m* at whatever position the gage M may be placed in the arc O. When thrown entirely back, the gage rests against the stop S upon the table. $m^2$, $m^3$, and $m^4$ are lugs securing the spring to the support and gage.

In machines of this class hitherto the slotted arc O has never extended past the center line. As shown in this machine, the extension of this arc enables the gage M to be thrown farther around to the stop S, and a far greater variety of angles can be cut and pieces of irregular shape—as cones, beads, segments, and curved pieces—can be trimmed in a manner not possible with previous machines for want of space in which to arrange them.

Again, it will be obvious that the increased play of the knives will give an extended cutting-surface, and therefore they will wear longer and require less sharpening to keep them in order.

The sliding gage is also a great advantage for trimming small pieces and cutting uniform lengths of wood, as well as for supporting segments and irregularly-shaped pieces.

The detachable lever for operating the pinion is useful, since the purchase can always be obtained at a vertical angle, which is much more convenient for long cuts. It will also be seen that the lever can always be placed at any angle most convenient for the workman operating it.

Having described my invention, what I claim as new, and desire to secure by Letters Patent, is—

1. In a wood-trimming machine, a reciprocating carriage, a knife sliding in ways thereon, means on the carriage and in connection with the frame for giving movement to said knife, and means for moving the carriage, substantially as described.

2. In a wood-trimming machine, a reciprocating carriage, a knife at each end thereof, sliding in ways thereon, means on the carriage and in connection with the frame for giving cutting movement to said knives alternately, and means for moving the carriage, substantially as described.

3. In a wood-trimming machine, a reciprocating carriage, a knife at each end, sliding in ways, and means on the carriage, operated by the movement thereof, in connection with the frame and each of the knives for moving the same, substantially as described.

4. In combination, in a trimming-machine, a post, a gage having a plain front face, a beveled edge, and a recess on the rear face, forming a bearing approximately at right angles to the line of the beveled face, substantially as described.

5. In combination with a trimming-machine, a swinging gage, and a supplemental gage supported thereby, adjustable lengthwise thereof and having movement to and from the face of the main gage to bring it into or throw it out of action, substantially as described.

6. In a wood-trimming machine, means for cutting the wood with a drawing cut, consisting in the reciprocating cross-head, knives mounted in outwardly-inclined slots in the cross-head, angular levers connecting said knives and pivoted upon the cross-head, with means for alternately raising and lowering the knives in the slots when the cross-head reciprocates, consisting in an arm forming part of the angular levers at one extremity and adjustably pivoted to the cross-head guides at the other extremity, substantially as described.

7. In a wood-trimming machine, a main frame or table, supports at either end of the table for a cross-head guide and similar guide at the foot of the table, a cross-head adapted to reciprocate in these guides by means of a rack on the cross-head and gear upon bearings in the bed-plate and provided with slots obliquely diverging, knives guided by these slots and connected by movable pivots with angular levers, a pivot connecting said levers with the cross-head, and an arm forming part of said levers at one extremity and movably pivoted to one of the cross-head guides at the other, substantially as set forth.

8. In a wood-trimmer, means for propelling knives with both vertical and horizontal movements to obtain a resultant angle of forty-five degrees, consisting in a reciprocating cross-head provided with obliquely-diverging slots, knives mounted in bearings in said slots, angular levers pivoted to said cross-head and adjustably pivoted to the knives at their outer extremities, and an arm forming part of the angular levers at one extremity and adjustably pivoted to one of the cross-head guides at the other, in combination with a horizontal table provided with vertical supports for the upper cross-head guide, also with a central opening in the support underneath the guide and with vertical shearing-edges to the supports on either side of the opening, substantially as described.

9. In a wood-trimming machine, a cross-head supported in upper and lower guides, knives clamped movably in slots obliquely diverging from the base of the cross-head, angular levers pivoted to the cross-head and pivotally connected to said clamps, and an arm forming part of the said levers at one extremity and at the other sliding in a bearing pivoted to the upper cross-head guide, substantially as described.

10. In a wood-trimming machine, a main bed or table, supports at either end of the table for a cross-head guide, a similar lower guide upon the bed-plate, a vertical shearing-edge upon each of the supports, a cross-head moving in said guides, obliquely-diverging slots in the cross-head, knives sliding in said slots and retained therein by clamps, a rack upon the cross-head and pinion mounted upon the bed-plate, angular levers connecting the knives and pivoted to the cross-head, and an arm forming part of the levers at one extremity and movably pivoted to the cross-head guide at the other extremity, in combination with triangular gages adjacent to the shearing edges aforesaid, a curved bearing-surface on each of the supports for the gages, and plane bearing-surfaces upon the gages, substantially as described.

11. In a wood-trimming machine, a cross-head reciprocating in upper and lower guides, a table adjacent to the cross-head, knives having an oblique reciprocation derived from the movements of the cross-head, vertical edges upon the cross-head-guide supports inclosing an opening, and gages adjacent to the said opening and provided with vertical shearing-edges, substantially as described.

12. In a gage for a trimming-machine, a vertical body portion resting upon the bed-plate of the machine, which is provided with an extended slot, a clamping-screw in the outward foot of the gage and slot, a vertical beveled inner edge of the gage, and means for preserving the alignment of the edge of the gage, and shearing-edge for the knives, consisting in the plane surface *m* on the inner edge of the gage and curved surface *m′*, projecting from the upper cross-head guide, in combination with the auxiliary gage provided with enlarged head, substantially as described.

13. In a gage for a trimming-machine, a vertical plate M, resting upon the bed-plate A and provided with the vertical beveled inner edge M′, a plane bearing-surface *m*, adapted to engage the curved surface *m′* upon vertical supports upon the machine-frame, the angular depressions Q′, adapted to register with the bosses Q upon the supports B when the gage is turned back, and a clamping-screw O′, moving in the slot O in the bed-plate A, all substantially as described.

14. In a trimming-machine, a vertical gage provided with a beveled edge, an extended foot provided with a clamping-screw, adapted to move in a slot in the machine bed-plate, and an auxiliary gage sliding in a recess in the main gage, an enlarged head to the sliding gage, and a recess for the head in the main gage, substantially as described.

15. In a wood-trimmer, a triangular swinging gage provided with a vertical shearing-edge and located adjacent to the vertical edge of a cross-head-guide support and also provided with a rectangular boss upon its upper extremity, a curved projection integral with the edge of the cross-head guide at its upper extremity, adapted to engage said rectangular boss upon the gage in the base of the main gage, a head upon the auxiliary gage, and depressions in the main gage, adapted to receive said head, and a clamping-screw passing through the extended base of the main gage and the clamp for the auxiliary gage, substantially as described.

16. In a wood-trimmer, a gage to regulate the angle of the cut, consisting in the triangular portion M, provided with depressions Q′, engaged by rectangular bosses Q, in combination with the rectangular boss *m*, and curved boss *m′*, and circular slot, and clamping-bolt, substantially as described.

17. Means for securing alignment between the vertical edge of a cross-head-guide support and a shearing-edge M′ on a gage, consisting in the face of a rectangular boss *m*, a curved surface *m′*, a spring R, and projections Q upon the support, engaging corresponding openings Q′ in the gage, substantially as described.

CHARLES NERACHER.

Witnesses:
ANDREW DREXLER,
C. A. KRAUSS, Jr.,
E. A. KRAUSS.